Aug. 19, 1958 M. M. PALO 2,848,559

UNIVERSAL PHONOGRAPH PICK-UP CARTRIDGE

Filed Feb. 3, 1955

INVENTOR
MAURICE M. PALO

BY *Francis J. Klempay*
ATTORNEY 2,848,559

UNIVERSAL PHONOGRAPH PICK-UP CARTRIDGE

Maurice M. Palo, Conneaut, Ohio, assignor to The Astatic Corporation, Conneaut, Ohio, a corporation of Ohio Application February 3, 1955, Serial No. 485,990

3 Claims. (Cl. 179—100.41)

The present invention relates to phonograph apparatus, and more particularly to improvements and refinements in mechanical-electrical pick-up cartridges for incorporation in phonograph apparatus for the purpose of detecting the side-to-side undulations in the sound groove of a recording disc and translating such undulations into electrical signals capable of amplification and audible reproduction.

As an overall object, the present invention seeks to provide a novel and improved pick-up cartridge assembly of the type having a plurality of selectively usable record engaging stylii which is characterized by the provision of a novel and highly simplified arrangement for mounting and manipulating the several stylii. The invention herein set forth is concerned primarily with multiple stylii pick-up cartridges of the general class disclosed in U. S. Patent No. 2,702,317 issued February 15, 1955, to Maurice M. Palo and Paul V. Kelly, wherein there is provided a single stylus mounting wire having divergent record engaging stylus tips thereon, which stylus mounting wire is rotatable about its own axis independently of the cartridge assembly as a whole, including the mechanical-electrical transducer element thereof. In such assemblies, the stylus mounting wire is anchored at one end and is drivingly connected with the transducer element adjacent the stylus tips, with means being provided to rotate the stylus wire at its anchored end to selectively present one or the other of the stylus tips in record engaging position. One of the important aspects of the present invention resides in improvements in the manner of and means for anchoring and manipulating the stylus mounting member, to the general end that the assembly is more economical to manufacture, more rugged in use, and capable of more faithful and dependable operation than prior apparatus of a similar nature.

More specifically, it is one of the objects of this invention to provide a phonograph pick-up cartridge of the type having an independently rotatable stylus mounting member which is characterized by the provision of improved means for rotatably anchoring the stylus mounting member in integral portions of the cartridge housing whereby to render the overall assembly rugged, compact and generally simplified.

Another object of the invention resides in the provision of a phonograph pick-up cartridge assembly having the features set forth above which is further characterized by the provision of combined means for actively retaining the rotatable stylus wire anchoring means in predetermined position in the assembly and for preventing extraordinary deflection of the stylus tips and delicate transducer element.

The above and other objects and advantages of the invention will become apparent upon full consideration of the following detailed specification and accompanying drawing, wherein is disclosed a certain preferred embodiment of the invention.

Figure 1:
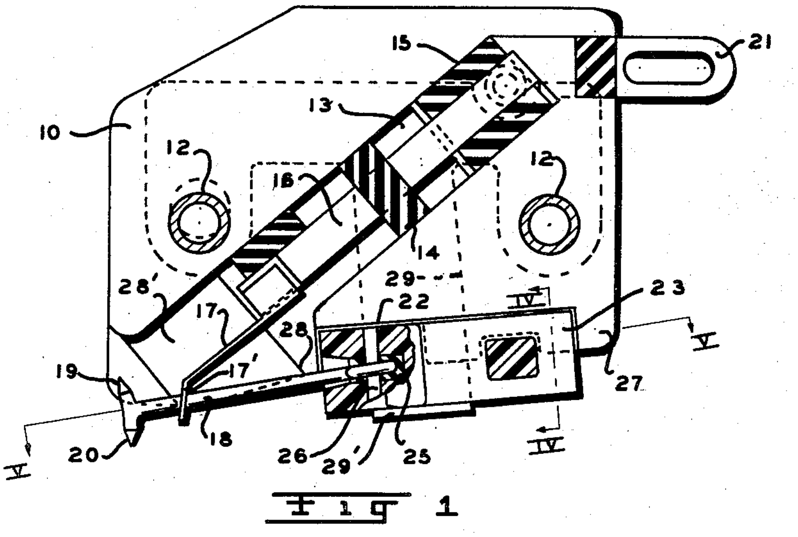
Figure 1 is an enlarged longitudinal section view of a phonograph pick-up cartridge constructed in accordance with the teachings of my invention.

Referring now to the drawing the numerals 10 and 11 represent complementary molded plastic housing halves which are secured together by means of spaced tubular rivets 12 in such manner as to define an angularly disposed cavity 13 opening at the lower forward end of the housing or casing 10—11. Mounted within the cavity 13, by means of suitable resilient pads 14 and 15, is a piezo-electric transducer element 16 having a lower forward free end portion 16′ to which is mounted a driving or coupling member 17. The driving member 17 is provided with a bifurcated lower end portion 17′ which is adapted to receive the forward end portion of a stylus mounting member or wire 18, as shown in Figure 1.

Stylus mounting member 18 is provided at its extreme forward end with a pair of oppositely related record engaging stylus tips, 19 and 20 which may be of one mil and three mil point radius for accommodation of micro-groove and standard recording discs respectively. The opposite end of the stylus mounting member 18 is anchored resiliently to the cartridge assembly, affording a cantilever type construction, so that as one or the other of the stylus tips follows the undulating sound groove of a recording disc the side to side movements of the tip are imparted accurately to the transducer or crystal element 16, through the driving member 17. In this manner, the element 16 is flexed in proportion to the movements of the stylus tips 19 and 20, and corresponding electrical signals are generated within the crystal 16. These signals or charges are transmitted through foil electrodes, not specifically designated, to terminal pins 21 which, in the complete phonograph assembly, are connected to a suitable amplifying network, not shown.

In order to rotate the stylus mounting member 18 to selectively present the stylii 19 and 20 in record engaging position it is common to provide movable or rotatable means for anchoring the fixed end of the stylus wire 18. Such means may be positioned forwardly of the cartridge assembly as a whole, as in the heretofore mentioned Palo et al. U. S. Patent No. 2,702,317, or generally below the cartridge assembly, as in U. S. Patent No. 2,689,734, issued September 21, 1954, to E. Wennerbo et al. The present invention incorporates the general class of stylus operating mechanisms represented by the Wennerbo et al. disclosure and is characterized by certain improvements lending to the overall substantial improvement of the cartridge assembly.

Thus, in accordance with the teachings of the invention the cartridge housing 10—11 is provided along its lower edge with a molded downwardly opening semi-circular or semi-cylindrical recess 22 which is arranged to closely receive a cylindrical stylus anchoring member 23. The stylus anchoring member 23 is provided at its forward end with a more or less rectangular opening 24 which is arranged to receive a rounded eye portion 18′ provided at the end of the stylus wire 18 in such manner that the stylus wire 18 and anchoring member 23 are interlocked against relative rotational movements.

In addition, there is received within the rectangular end opening 24 a folded or U-shaped resilient pad 25 which engages opposite flat sides of the recess 24 and resiliently clamps the eye portion 18' of the stylus mounting member. And in the illustrated embodiment of the invention there is further provided a transversely disposed locking pin 26 which extends through the anchoring member 23 and the opening eye 18' whereby to prevent withdrawl of the stylus mounting member 18 from its anchoring recess 24.

At the rearward end of the cartridge housing 10—11 there is provided an integral abutment wall 27 which serves to confine or limit movement of the cylindrical anchor member 23 in a rearward direction. Similarly, while the forward end of the semi-circular recess 22 opens into the transducer housing cavity 13, there are provided integral molded abutment portions 28, to be presently described in further detail, which operate to limit movement of the cylindrical member 23 in a forward direction.

Figure 4:
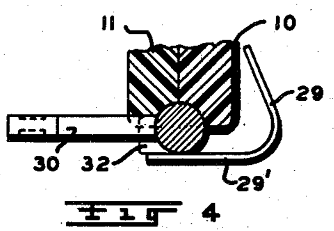
Figure 4 is a fragmentary section view taken along line IV—IV of Figure 1.

To retain the cylindrical member 23 in its recess 22, while providing for the rotation thereof to selectively present the stylus tips 19 and 20 in operative position, there is provided an L-shaped spring member 29 which is affixed to the cartridge housing 10—11 by means of the rivets 12, and which is provided with a horizontally extending portion 29' which underlies the transducer housing, substantially in the manner shown in Figure 4. The end portion 29' of the spring is spaced somewhat below the lower side of the housing 10—11, but sufficiently close thereto to cause a resilient pressure to be maintained against the lower side of the cylindrical anchor member 23 to normally retain the same in operative relation within the recess 22, while providing for the free removal of the member 23 where it is necessary or desirable to replace worn styli.

In order to conveniently rotate the cylindrical anchor member 23, to selectively move the stylus tips 19 and 20 into record engaging position, I provide a lever 30 which extends transversely of the cylindrical member 23, outwardly of the housing 10—11, so that it may be easily manipulated manually. The lever 30 may be formed integrally with the cylindrical portion 23, or may be attached thereto, as will be readily understood.

Figure 3:
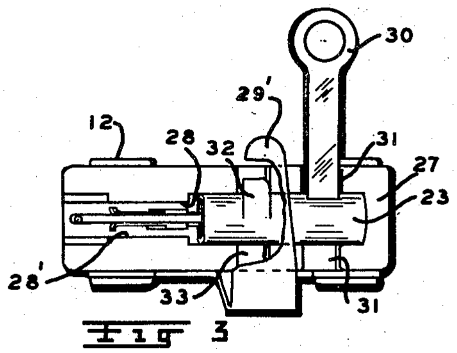
Figure 3 is a bottom plan view of the cartridge of Figure 1, with parts broken away to show details of my invention.
Figure 5:
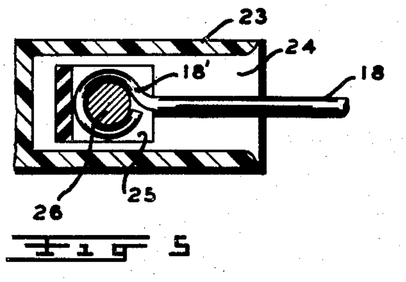
Figure 5 is a fragmentary longitudinal section view taken generally along line V—V of Figure 1.

In the illustrated and preferred embodiment the molded recess 22 in the housing 10—11 is arranged to encompass approximately one-half of the cylindrical anchor member 23, as shown in Figures 3 and 4, and for this reason there are provided in the housing 10—11, adjacent the recess 22, opposed transverse recesses 31 which are adapted to receive the inner or shank portion 32 of the lever 30 when the same is moved into one or the other of its horizontal operative positions.

In accordance with the teachings of the invention the cylindrical anchor member 23 is also provided forwardly of the lever 30 with an integral generally rectangular boss 32 which underlies the free end portion 29' of the anchor retaining spring 29. Adjacent the boss 32, the housing 10—11 is provided with opposed recesses 33 which are adapted to receive boss 32 when the lever 30 is in one or the other of its operative positions.

Most conveniently, the boss 32 extends transversely to the cylindrical member 23 in parallel relation to the lever 30. However, the boss 32 is stub-like, and projects only slightly outwardly of the cylindrical outer surface of the anchor member 23. The arrangement is such that during rotation of the lever 30 the stub-like boss 32 causes the spring 29 to be deflected, and a detent action is obtained, whereby the stylus-anchor assembly may be releasably held in a preselected position.

Figure 2:
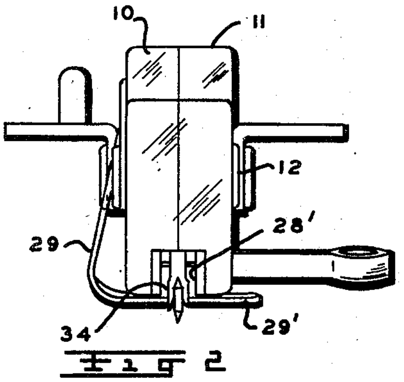
Figure 2 is a front end elevation of the cartridge of Figure 1.

Referring now to Figures 1 and 2, it will be observed that the abutments 28, which define the forward end of the anchor receiving cavity or recess 22, comprise rearwardly facing end portions of integral raised portions 28', forming parts of the housing halves 10 and 11. The raised portions 28' have limited inwardly facing surface areas which lie adjacent to but slightly spaced from flat side edge portions 34 of the coupling member 17. The arrangement is such that upon excessive side to side movement of the stylus mounting member 18 the side edges 34 of the coupling member will engage the inwardly facing surfaces 28' to limit further movement of the parts. Thus, while the permissible extent of stylus movement is more than adequate to provide for full side to side movement of the stylus tips during tracking of a record groove, further substantial movement, as might be caused by dropping or careless handling, is prevented. In this manner, the useful life of the delicate transducer element is increased, and the possibility of breakage due to mishandling is practically eliminated.

It should thus be apparent that I have fulfilled the objects initially set forth. I have provided a simplified and economical pick-up cartridge assembly which embodies a number of improved features resulting in improved performance and increased operating life.

One of the important features of the invention resides in the provision of a molded cylindrical rotatable stylus anchoring member which is received in a molded semi-circular recess in the cartridge housing. This arrangement affords a highly economical construction, and in addition assures proper alignment of the cylindrical stylus anchoring member with respect to the assembly as a whole. Thus, in the past it has been proposed to mount such stylus anchoring members by means of separately attached stamped journal members and the like, which not only involves at least one additional component, but increases the possibility of assembling the several components in misaligned relation.

Another novel feature of the invention resides in the provision of a molded integral stub-like boss upon the cylindrical stylus anchoring member which coacts with a spring-like retaining member for the anchoring member to provide a detent to releasably hold the stylus anchoring member in one or the other of its rotative positions.

In addition to the above features, I further provide for the protection of the delicate piezo-electric element by means of movement limiting abutment surfaces formed as an integral molded part of the cartridge housing and operative to engage the side edges of the stylus-transducer coupling member, or some other member, so that in the event of mishandling of the assembly the transducer element is not broken or damaged.

It should be understood, however, that the embodiment herein specifically illustrated and described is intended to be representative only, as many changes may be made therein without departing from the clear teachings of the invention. Reference should therefore be had to the following appended claims in determining the full scope of the invention.

I claim:

1. In a phonograph pick-up cartridge of the type comprising a housing having a cavity therein, a piezo-electric element housed within said cavity, a coupling member secured to one end of said element, a stylus mounting member engaged adjacent one end thereof by said coupling member and anchored at its other end, said stylus mounting member having a plurality of divergently related record engaging stylus tips at said one end, means to anchor said other end with respect to said housing, and means to rotate said means to anchor whereby to rotate said stylus mounting member about its own axis for selectively presenting said tips in record engaging position; the improvement characterized by said means to anchor comprising a cylindrical member having means at one end for the reception and anchoring of said other end of said stylus mounting member, said housing having a molded semi-cylindrical recess therein for the reception and journaling of said cylindrical member, said recess being enclosed at its forward and rear ends by integral abutment means, means to restrict side to side movement of said coupling member, resilient means on said housing acting upwardly upon said cylindrical member to retain the same in said recess, said forward abutment means comprising abutment surfaces defining rearward edge portions of integral raised lands partially enclosing said cavity, and said lands having flat surfaces positioned on either side of said coupling member and adapted to restrict side to side movement of the latter.

2. In a phonograph pick-up cartridge comprising a housing having a cavity therein, a piezo-electric transducer mounted in said housing and having a freely disposed portion adapted to be flexed for the generation of electrical potential, a coupling member carried by and secured to the outer free end of said transducer, a stylus mounting member engaged adjacent one end thereof by said coupling member and anchored at its other end, said stylus mounting member having a plurality of divergently related record groove engaging stylus tips at said one end, means to anchor said other end with respect to said housing, and means to rotate said means to anchor whereby to rotate said stylus mounting member generally about its own axis for selectively presenting said stylus tips in record groove engaging position; the improvement characterized by said means to anchor comprising a cylindrical member having means at one end for the reception of said other end of said stylus mounting member, said housing having an integral semi-cylindrical recess formed therein for receiving and journaling said cylindrical member, said semi-cylindrical recess being at least partially enclosed at its forward and rear ends by integrally formed abutment means, means to resiliently urge said cylindrical member into said semi-cylindrical recess, said cylindrical member having an integral projecting boss extending therefrom underlying said means to resiliently urge, and said housing having integral recesses therein on opposite sides of said semi-cylindrical recess for the reception of said boss, the arrangement being such that said cylindrical member is confined to limited rotational movement and said boss and said means to resiliently urge, form a detent means to retain said cylindrical member in preset operative position.

3. In a phonograph pick-up cartridge of the type comprising a housing having a cavity therein, an electromechanical transducer mounted in said cavity, a stylus mounting member connected in operative relation with said transducer by a coupling member, said stylus mounting member having a plurality of divergently related record groove engaging stylus tips at one end thereof, means to anchor the other end of said stylus mounting member with respect to said housing, means to rotate said means to anchor whereby said stylus mounting member is caused to rotate about its own axis for selectively presenting said tips in record engaging position, and means to restrict the side to side movement of said coupling member within preselected limits; the improvement characterized by said means to restrict comprising a member rotatively received in a recess integrally formed in said housing, said member adapted to receive and anchor said other end of said stylus mounting member, said recess having the forward and rear ends thereof at least partially blocked by abutment means formed integrally with said housing, said forward abutment means defining edge portions of integral raised lands partially enclosing said cavity, said lands having flat surfaces positioned on either side of said coupling member and adapted to restrict side to side movement of the latter.

References Cited in the file of this patent

UNITED STATES PATENTS

| | | |
|---|---|---|
| 2,717,929 | Klingener | Sept. 13, 1955 |
| 2,742,530 | Mayer | Apr. 17, 1956 |